(12) United States Patent
Manroa et al.

(10) Patent No.: US 8,068,865 B1
(45) Date of Patent: Nov. 29, 2011

(54) SYSTEM AND METHOD FOR TRANSMITTING TONES IN A PUSH-TO-TALK (PTT) SYSTEM

(75) Inventors: Arun Manroa, Herndon, VA (US); Zheng Cai, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 455 days.

(21) Appl. No.: 12/401,694

(22) Filed: Mar. 11, 2009

(51) Int. Cl.
*H04B 7/00* (2006.01)
(52) U.S. Cl. ......... 455/518; 455/517; 455/519; 455/521
(58) Field of Classification Search .................. None
See application file for complete search history.

(56) References Cited

U.S. PATENT DOCUMENTS

| | | | |
|---|---|---|---|
| 7,774,011 B2 * | 8/2010 | Sung et al. ..................... | 455/518 |
| 2006/0229093 A1 * | 10/2006 | Bhutiani et al. .............. | 455/518 |
| 2007/0249381 A1 * | 10/2007 | Forslow ........................ | 455/517 |

* cited by examiner

Primary Examiner — Anh Tran

(57) ABSTRACT

Systems and methods for allowing transmission of tones by a push-to-talk (PTT) communication station are provided. The communication station can decouple the PTT button of the PTT communication station, allowing the transmission of the tones without actuating the PTT button. The decoupling can be performed in response to receipt of an unsolicited floor grant message. The communication station can also receive an input selection and automatically transmit a floor request message, a tone corresponding to the input selection and a floor release message.

19 Claims, 8 Drawing Sheets

US 8,068,865 B1

SYSTEM AND METHOD FOR TRANSMITTING TONES IN A PUSH-TO-TALK (PTT) SYSTEM

BACKGROUND OF THE INVENTION

Wireless communication networks typically provide a number of different services, such a voice and data communication services. Most wireless communication networks typically offer a single type of voice communication service, interconnect voice communication services (also referred to as circuit-switched voice communication services). Interconnect voice communication services provide a full-duplex communication between two communication endpoints.

Another type of voice communication service is push-to-talk voice communication service (also referred to as dispatch communication service), which involves a half-duplex communication between two or more communication endpoints, such as push-to-talk communication stations. Thus, a push-to-talk call requires floor control to ensure that only one endpoint has permission to talk at any particular time during the call. Push-to-talk systems typically implement floor control by having communication stations send a floor request message when the push-to-talk button is depressed and a floor release message when the push-to-talk button is released. When none of the communication stations of a push-to-talk call currently controls the floor, any of the communication stations can request the floor by depressing the push-to-talk button. While the push-to-talk button is depressed the user can speak into the communication station and the voice is transmitted to other communication stations of the push-to-talk call. When the push-to-talk button is released a floor release message is transmitted by the communication station.

SUMMARY OF THE INVENTION

Exemplary embodiments of the present invention provide systems and methods for transmitting tones, such as dual tone multiple frequency (DTMF) tones, during a push-to-talk call.

In accordance with one aspect of the present invention systems and methods are provided that involve receiving, by a push-to-talk (PTT) communication station, a floor grant message, and determining, based on the floor grant message, to decouple a PTT button of the PTT communication station. The systems and methods also involve receiving, by the PTT communication station, first and second input selections, and transmitting first and second tones that respectively correspond to the first and second input selections. The first and second tones are transmitted independent of an actuation of the PTT button.

In accordance with another aspect of the present invention systems and methods involve transmitting, by an application server to a push-to-talk (PTT) communication station, voice information, and transmitting, by the application server to a PTT server, a message related to floor control. The systems and methods also involve receiving, by the application server from the PTT communication station, a first and second tone, and determining, by the application server, a selection corresponding to the first and second tones that is responsive to an option provided by the voice information.

In accordance with another aspect of the present invention, systems and methods involve receiving, by a push-to-talk (PTT) communication station, an input selection. In response to the input selection the PTT communication station sequentially transmits a floor request message to a PTT server, a tone corresponding to the input selection to an application server, and a floor release message to the PTT server.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Exemplary embodiments of the present invention provide systems and methods of transmitting tones in a PTT call. Although exemplary embodiments are described below in connection with a PTT call between a PTT communication station and an application server, the present invention is not so limited. For example, the present invention can also be employed for transmitting tones between two or more PTT communication stations.

Figure 1A:
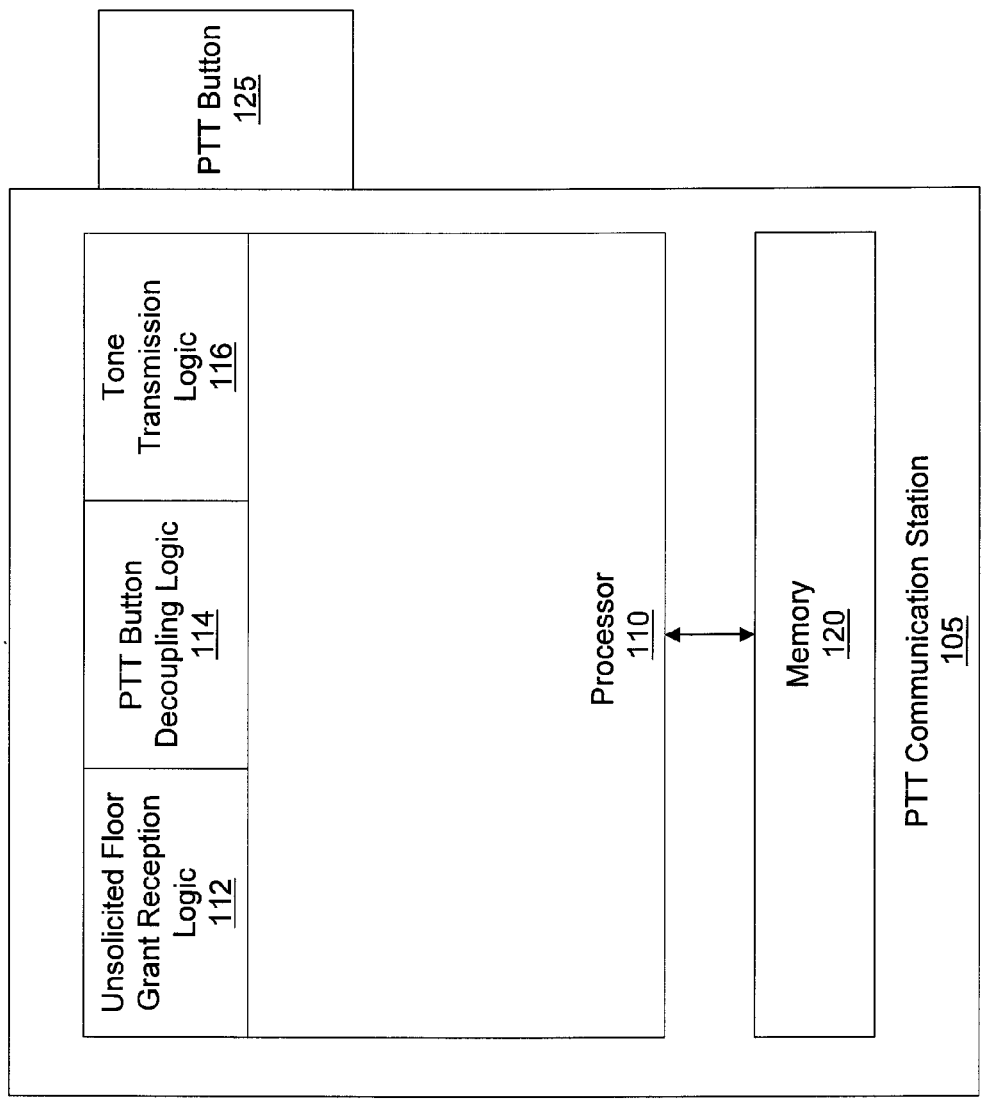
FIG. 1A is a block diagram of an exemplary PTT communication station in accordance with the present invention.

FIG. 1A is a block diagram of an exemplary PTT communication station in accordance with the present invention. PTT communication station 105 includes processor 110 coupled to memory 120 and PTT button 125. Processor 110 includes logic 112-116, which will be described in more detail below in connection with FIGS. 2A through 4B. Processor 110 can be a field programmable gate array (FPGA), application specific integrated circuit (ASIC) and/or a microprocessor. When processor 110 is a microprocessor, logic 112-116 can be processor-executable code loaded from memory 120.

Figure 1B:
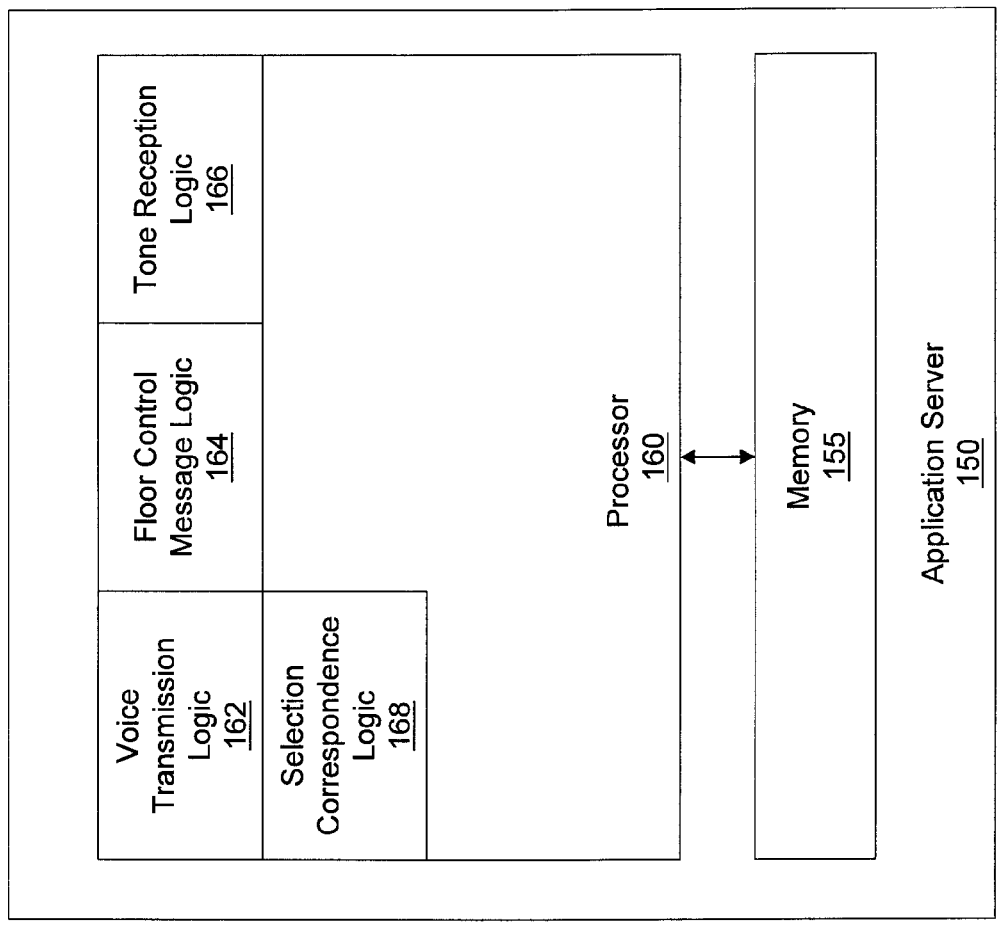
FIG. 1B is a block diagram of an exemplary application server in accordance with the present invention.

FIG. 1B is a block diagram of an exemplary application server in accordance with the present invention. Application server 150 includes memory 155 coupled to processor 160. Processor 160 includes logic 162-168, which will be described in more detail below in connection with FIGS. 2A-4B. Processor 160 can be any type of processor, including a field programmable gate array (FPGA), application specific integrated circuit (ASIC) and/or microprocessor. When processor 160 is a microprocessor, logic 162-168 can be processor-executable code loaded from memory 155.

Figure 2A:
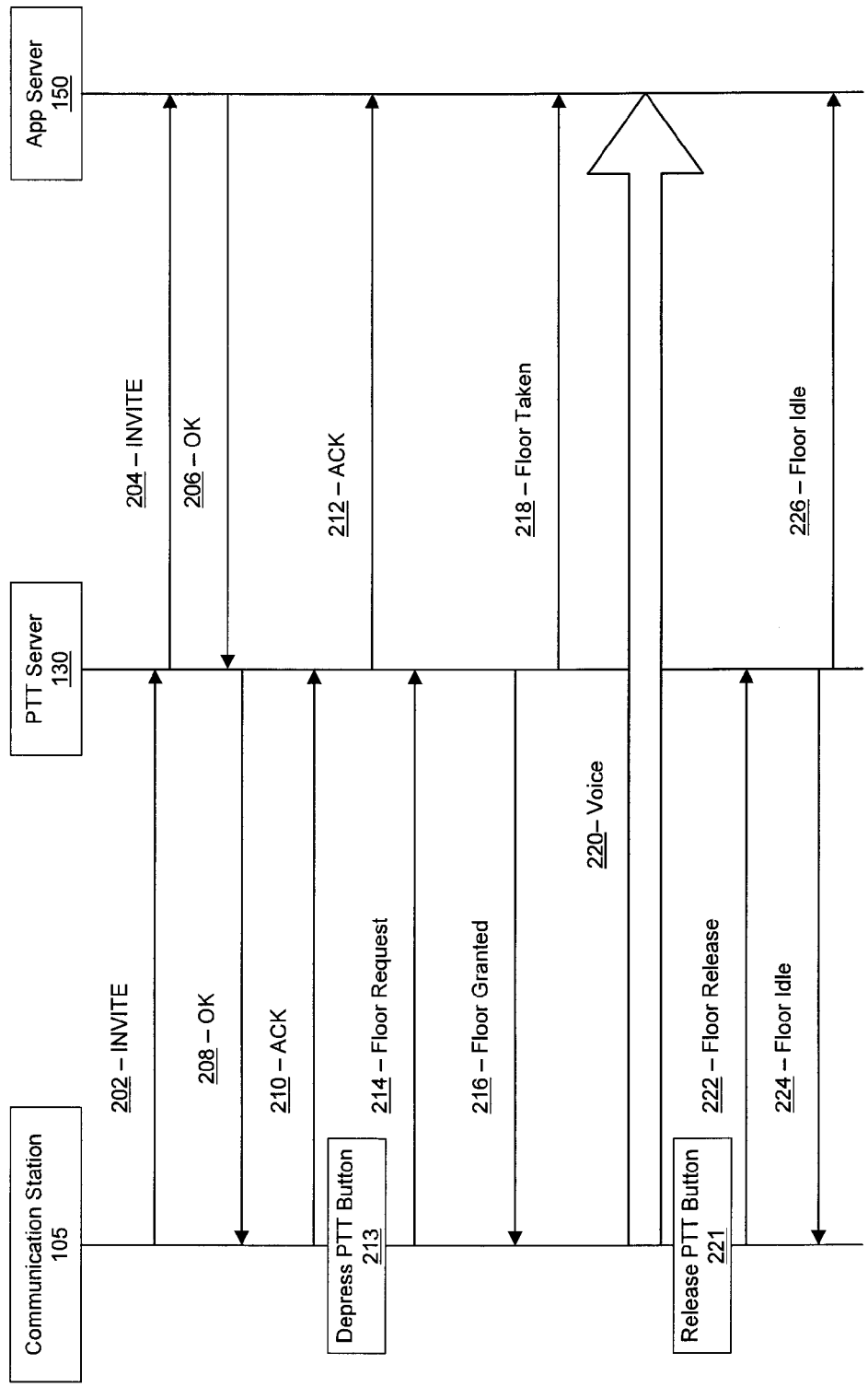
FIGS. 2A-2C are call flow diagrams in accordance with one aspect of the present invention.
Figure 2B:
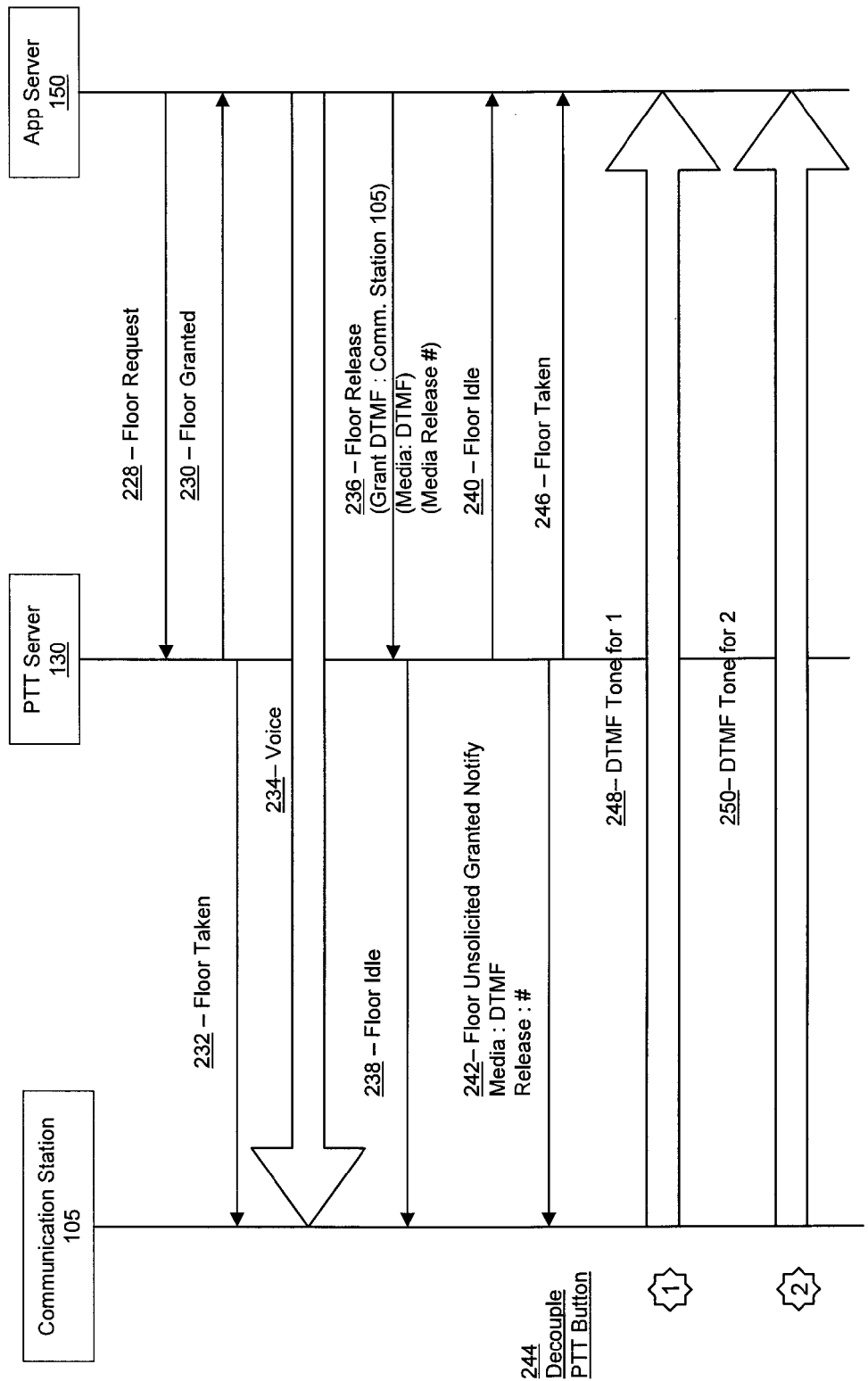
Figure 2C:
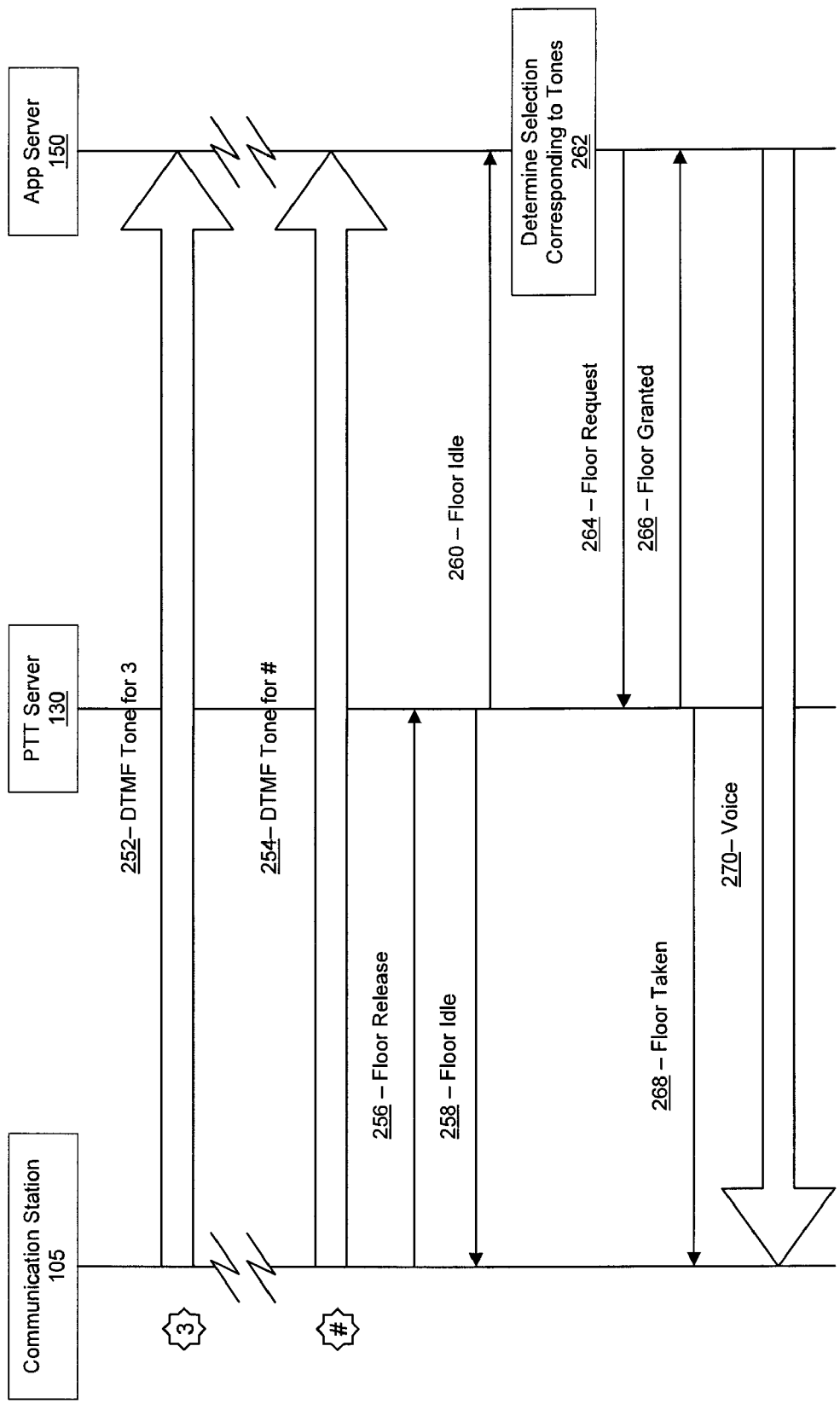

FIGS. 2A-2C are call flow diagrams in accordance with one aspect of the present invention. Initially, when access to application server 150 is desired, a communication address of the application server is entered into communication station 105 and PTT button 125 is actuated (i.e., depressed and released). In response, communication station 105 sends an INVITE message to PTT server 130 (step 202), which then forwards the INVITE message to application server 150 (step 204). Application server 150 replies with an OK message to confirm that the application server is available to participate in the PTT call (step 206). PTT server 130 forwards the OK message to communications station 105 (step 208), which then replies with an ACK message (step 210). PTT server 130 then forwards an ACK message to application server 150 (step 212), which establishes a PTT call between communication station 105 and application server 150.

Communication station 105 can then request the floor of the established call by depressing PTT button 125 (step 213). Communication station 105 then sends a floor request message to PTT server 130 (step 214), which replies with a floor granted message (step 216). PTT server 130 notifies application server 150 that the floor has been granted to another communication endpoint by sending a floor taken message to application server 150 (step 218). Communication station 105, having the floor and having the PTT button still depressed, can send voice information to application server 150 (step 220). The voice information can be a request for a service provided by application server 150. For example, application server 150 can provide a number of different services, such as weather, news, horoscopes, sports scores and/or the like. Accordingly, the voice information can be a request for the weather service.

When the PTT button 125 is released (step 221), communication station 105 sends a floor release message to PTT server 130 (step 222). PTT server 130 then sends floor idle messages to communication station 105 and application server 150 to notify the communication endpoints that the floor is open (steps 224 and 226).

Application server 150 can then send a floor request message to PTT server 130 (step 228), which then sends a floor granted message to application server 150 (step 230) and a floor taken message to communication station 105 (step 232). Logic 162 of processor 160 of application server 150 then sends voice information to communication station 105 (step 234). Continuing with the example above, the voice information can be a request for the communication station 105 to provide a zip code for desired the weather information.

When application server 150 has completed sending the voice information, logic 164 sends a floor release message indicating that an unsolicited floor grant should be made to communication station 105 (step 236). The floor release message identifies the communication station, that the media is dual tone multiple frequency (DTMF) and a media release identifier, which in this case is the "#" symbol. In response to receiving the floor release message, PTT server 130 sends floor idle messages to communication station 105 and application server 150 (steps 238 and 240).

PTT server 130 then sends an unsolicited floor grant notification message to communication station 105 (step 242). The floor grant is unsolicited because communication station 105 did not send a floor request to PTT server 130. The unsolicited grant notification message identifies the media type as DTMF and the release identifier, and this message is received by logic 112.

Identifying the unsolicited grant notification message, logic 112 notifies logic 114 that the PTT button should decoupled (step 244). The decoupling of the PTT button allows the transmission of media from communication station 105 to application server 150 without requiring actuation of the PTT button 125, which in this case are DTMF tones. Specifically, in response to actuation of the number key "1", logic 116 sends a corresponding DTMF tone to application server 150 (step 248). Similarly, in response to actuation of number key "2", logic 116 sends a DTMF tone to application server 150 (step 250). Actuation of number key "3", logic 116 sends a DTMF tone to application server 150 (step 254). Although not illustrated, communication station 105 can send two additional tones to provide a total of five tones corresponding to a zip code. When key "#" is actuated, logic 116 transmits a corresponding DTMF tone to application server 150. Logic 114 recognizes the "#" as the release indicator, and accordingly sends a floor release message to PTT server 130 (step 256). In response to receiving this message, PTT server 130 sends floor idle messages to communication station 105 and application server 150 (steps 258 and 260).

Although not illustrated in FIGS. 2A-2C, logic 166 of application server 150 receives each of the tones and passes the received tones to logic 168. Logic 168 then determines a selection corresponding to the received tones (step 262), sends a floor request message (step 264), receives a floor granted message step 266) and then sends voice information corresponding to the selection (step 270). Returning again to the example above, the selection would correspond to a zip code of the digits entered by communication station 105. As illustrated in FIG. 2C, PTT server 130 sends a floor taken message to communication station 105 (step 268) after sending the floor granted message to application server 150.

Figure 3:
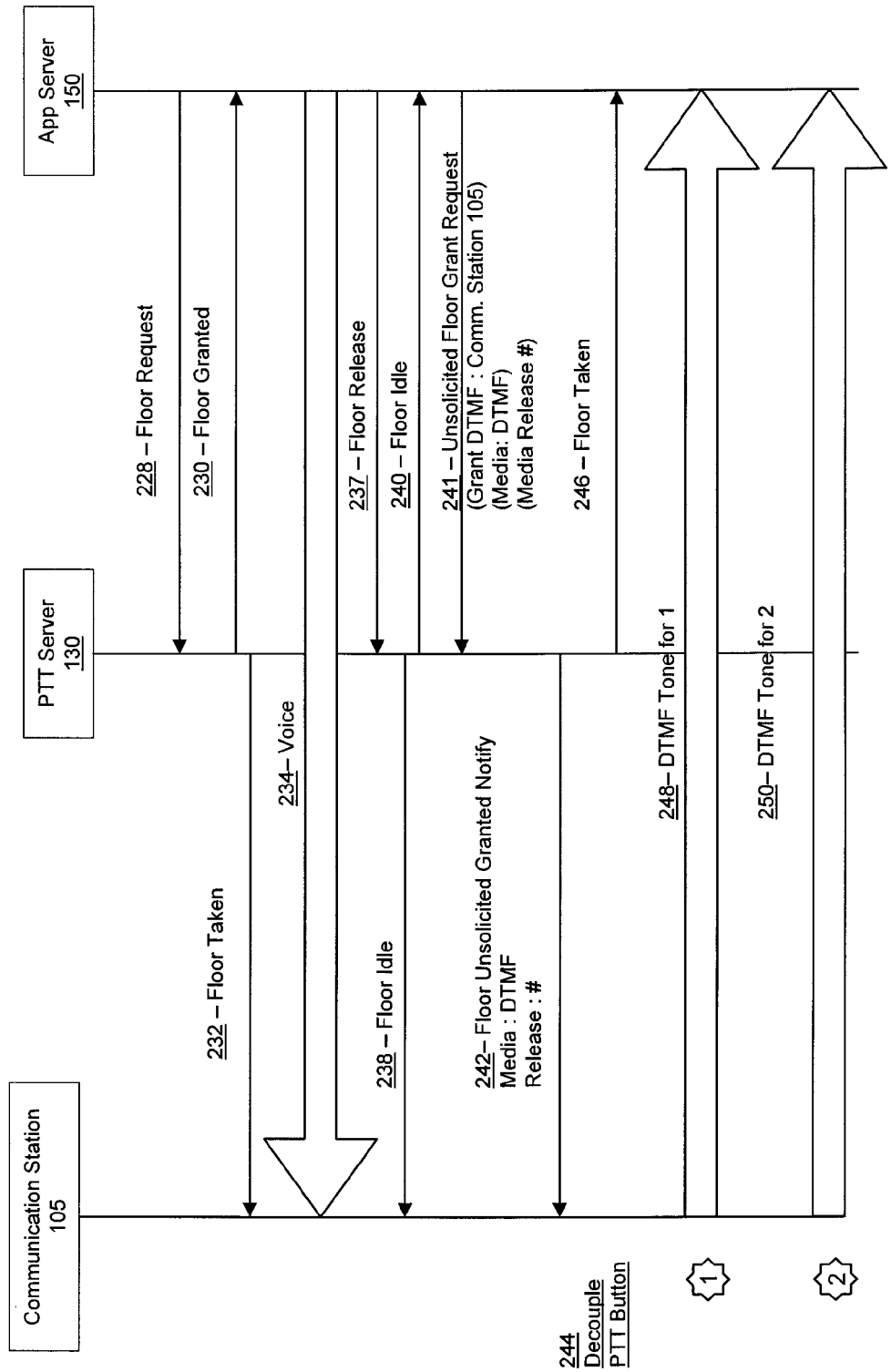
FIG. 3 is a call flow diagram in accordance with another aspect of the present invention.

FIG. 3 is a call flow diagram in accordance with another aspect of the present invention. Steps 202-232 described above in connection with FIGS. 2A and 2B will be performed similarly for the method of FIG. 3, and accordingly these steps will not be described in detail again. After application server 150 completes the sending of voice to communication station 105 (step 234), the application server sends a conventional floor release message to PTT server 130 (step 237). In response, PTT server 130 sends floor idle messages to communication station 105 and application server 150 (steps 238 and 240). Application server 150 then sends an unsolicited floor grant request message to PTT server 130 (step 241), which then sends an unsolicited floor grant notification message to communication station 105 (step 242). The unsolicited floor grant request message identifies communication station 105, the media type and the media release key, and the notification message identifies the media type and the media release key.

The remainder of the method of FIG. 3 operates in a similar manner to that of steps 244 through 260 described above in connection with FIGS. 2B and 2C, and will not be described in more detail again. The distinction between the methods of FIGS. 2A-2C and that of FIG. 3 is that in the method of FIGS. 2A-2C the floor release message (step 236) includes the request for granting the unsolicited floor grant, the media type and the media release key, whereas in the method of FIG. 3 this information is sent in a message separate from the floor release message.

Figure 4A:
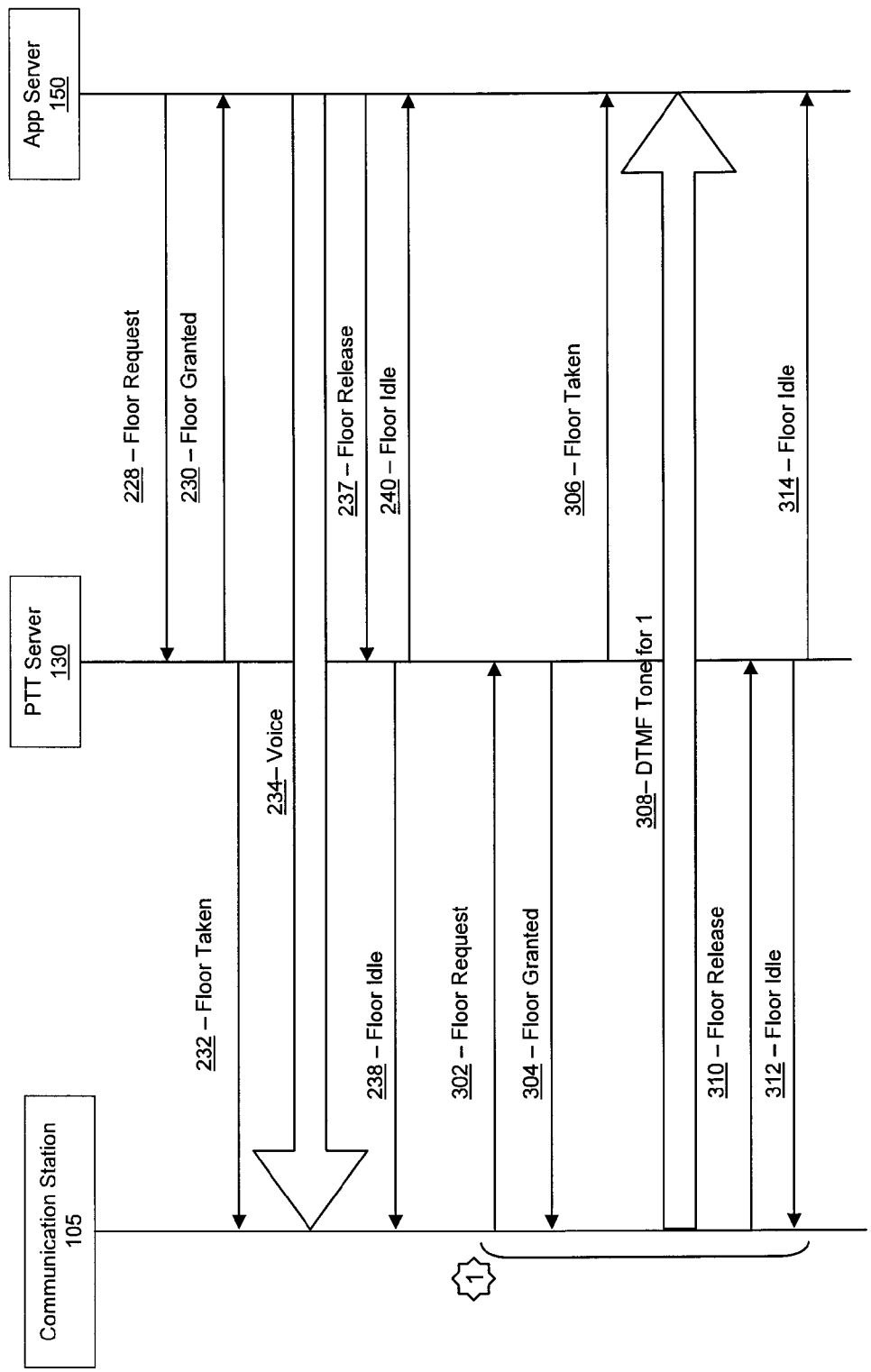
FIGS. 4A and 4B are call flow diagrams in accordance with yet another aspect of the present invention.
Figure 4B:
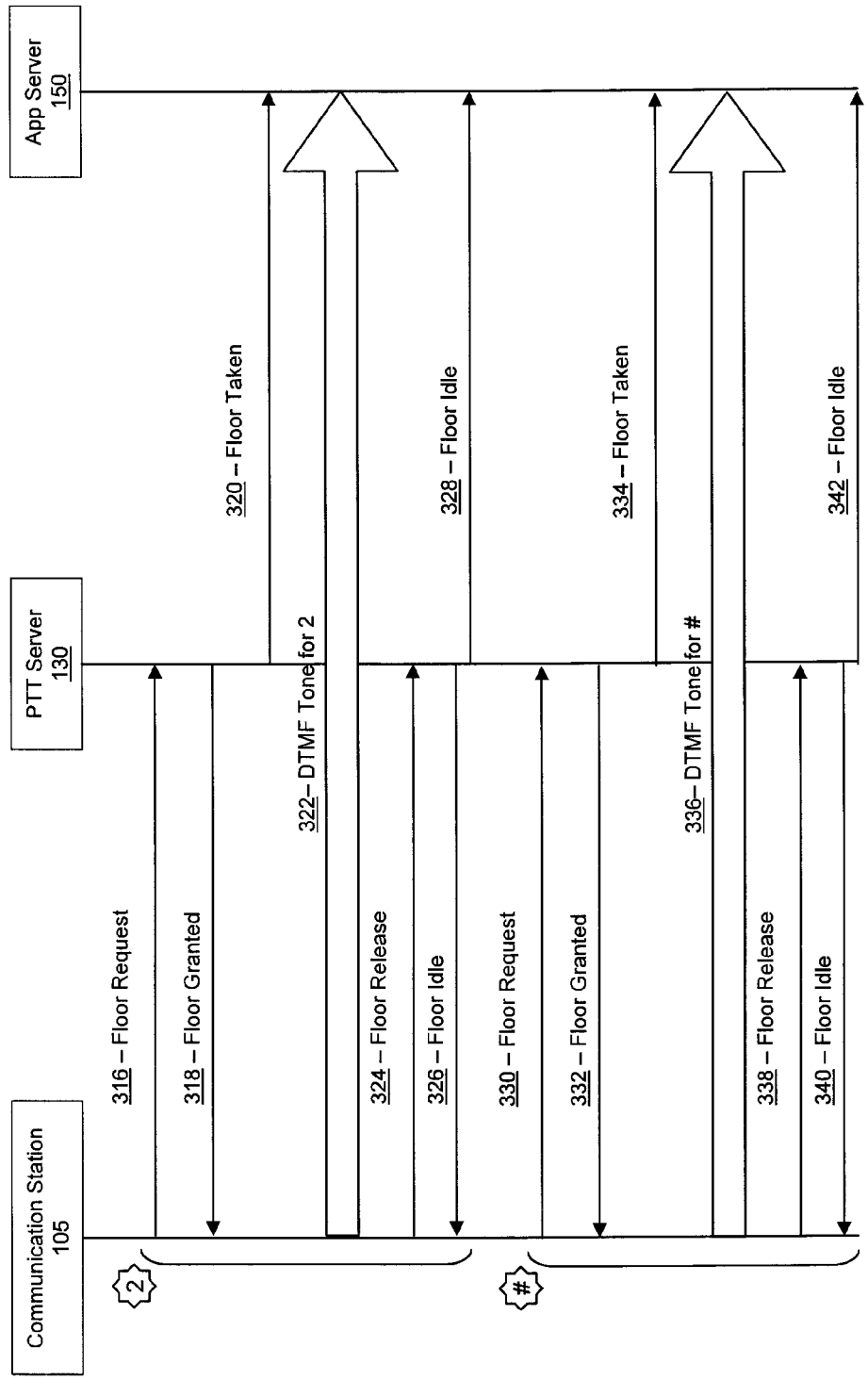

FIGS. 4A and 4B are call flow diagrams in accordance with yet another aspect of the present invention. Steps 202-232 operate in a similar manner to that described above in connection with FIG. 2A and FIG. 2B and these steps will not be described in detail again. After application server 150 finishes sending the voice to communication station 105 (step 234), the application server sends a floor release message to PTT server 130 (step 237). PTT server 130 then sends floor idle messages to communication station 105 and application server 150 (steps 238 and 240).

When communication station 105 detects a depression of a number on the key pad, in this case number "1", logic 114 controls the communication station to send a floor request message to PTT server 130 (step 302), which responds with a floor granted message (step 304). PTT server 130 then sends a floor taken message to application server 150 (step 306). Logic 116 then sends a DTMF tone corresponding to the number "1" to application server 150 (step 308), and a logic 114 sends a floor release message to PTT server 130 (step 310). PTT server 130 then sends floor idle messages to communication station 105 and application server 150 (steps 312 and 314).

The decoupling of the PTT button 125 in the method of FIGS. 4A and 4B does not involve an unsolicited floor request, but instead is based merely upon depression of a key on the key pad of the communication station, which then requests the floor, sends the corresponding tone and then sends a floor release message. Accordingly, for each subsequent depression of a number on the key pad, for example key pad depression key "2" steps 316 through 326 operate in a similar manner to that described above in connection with steps 302 through 314. In the method of FIGS. 4A and 4B the user of communication station 105 needs to notify application server 150 that the selection has been completed by sending a selection completed indication symbol, which in this case is the "#" key. This transmission involves steps 330 through 342, which operate in a similar manner to that described above in connection with steps 302 through 314.

Although the methods are described above with communication station 105 initially sending voice to application server 150, this is merely exemplary and not necessary. For example, communication station 105 can enter an address for application server 150 and then actuate (i.e., depress and release) PTT button 125 in order to establish the PTT call. Application server 150 could then request the floor and send voice information.

It should be recognized that the signaling illustrated in the figures is merely exemplary and that not all of the signaling is necessary for the present invention and such signaling should not limit the scope of the claims beyond their express language. Furthermore, the present invention can be practiced using similar messaging, but with different message names. The discussion above referred to a key pad, which should be understood as broadly representing any type of input mechanism, including physical keys, soft keys and/or keys on a touch screen.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising the acts of:
   receiving, by a push-to-talk (PTT) communication station, a floor grant message;
   determining, based on the floor grant message, to decouple a PTT button of the PTT communication station;
   receiving, by the PTT communication station, first and second input selections; and
   transmitting first and second tones that respectively correspond to the first and second input selections,
   wherein the first and second tones are transmitted independent of an actuation of the PTT button.

2. The method of claim 1, wherein the floor grant message is received independent of a floor grant request from the PTT communication station.

3. The method of claim 1, further comprising:
   receiving, by the PTT communication station, a third input selection; and
   transmitting, by the PTT communication station in response to the third input selection, a floor release message.

4. The method of claim 3, wherein the first and second input selections are numbers and the third input selection is an input other than a number.

5. The method of claim 4, wherein the floor grant message identifies the input corresponding to the third input selection.

6. The method of claim 1, wherein the first and second tones are dual-tone multiple frequency (DTMF) tones.

7. The method of claim 6, wherein the floor grant message indicates DTMF as a media type.

8. The method of claim 1, wherein the floor grant message is received in response to an application server transmitting a floor release message.

9. The method of claim 1, wherein floor grant message is received in response to an application server transmitting a floor grant message.

10. The method of claim 1, wherein prior to receipt of the floor grant message by the PTT communication station, the method comprises:
    receiving, by the PTT communication station, voice information from an application server, wherein the first and second tones are transmitted to the application server to indicate a selection responsive to an option provided by the voice information.

11. A method comprising the acts of:
    transmitting, by an application server to a push-to-talk (PTT) communication station, voice information;
    transmitting, by the application server to a PTT server, a message related to floor control;
    receiving, by the application server from the PTT communication station, a first and second tone; and
    determining, by the application server, a selection corresponding to the first and second tones that is responsive to an option provided by the voice information.

12. The method of claim 11, wherein the message related to floor control is a floor release message requesting a floor grant for the PTT communication station.

13. The method of claim 12, wherein the floor release message includes an identification of the PTT communication station, a media type and a media release input.

14. The method of claim 11, wherein the message related to floor control is a request for a floor grant for the PTT communication station that is transmitted subsequent to a floor release message.

15. The method of claim 14, wherein the request for the floor grant includes an identification of the PTT communication station, a media type and a media release input.

16. A method comprising the acts of:
    receiving, by a push-to-talk (PTT) communication station, an input selection, wherein in response to the input selection the PTT communication station sequentially transmits
    a floor request message to a PTT server;
    a tone, which corresponds to the input selection, to an application server; and
    a floor release message to the PTT server.

17. The method of claim 16, wherein the transmission of the floor request message, tone and floor release message are performed independent of a PTT button actuation.

18. The method of claim 16, further comprising:
    receiving, by the PTT communication station, another input selection, wherein in response to the another input selection the PTT communication station
    transmits a floor request message to the PTT server;
    transmits a tone, which corresponds to the another input selection, to the application server; and
    transmits a floor release message to the PTT server.

19. The method of claim 16, wherein the tone is a dual-tone multiple frequency (DTMF) tone.

* * * * *